United States Patent [19]

Burn

[11] 4,223,369
[45] Sep. 16, 1980

[54] MONOLITHIC CAPACITOR WITH LOW FIRING ZIRCONATE AND NICKEL ELECTRODES

[75] Inventor: Ian Burn, Williamstown, Mass.

[73] Assignee: Sprague Electric Company, North Adams, Mass.

[21] Appl. No.: 921,386

[22] Filed: Jul. 3, 1978

Related U.S. Application Data

[63] Continuation-in-part of Ser. No. 715,036, Aug. 17, 1976, Pat. No. 4,101,952.

[51] Int. Cl.² ............................................. H01G 4/12
[52] U.S. Cl. .................................. 361/321; 106/39.5; 252/63.5; 361/305; 361/320
[58] Field of Search ....................... 361/320, 321, 305; 252/63.2, 63.5; 106/39.5, 39.6

[56] References Cited

U.S. PATENT DOCUMENTS

| | | | |
|---|---|---|---|
| 3,153,179 | 10/1964 | Koenig | 252/63.5 |
| 3,619,220 | 9/1968 | Maher | 106/39.5 |
| 3,720,862 | 3/1973 | Mason | 361/320 |
| 4,027,209 | 5/1977 | Maher | 361/321 |
| 4,097,911 | 6/1978 | Dorrian | 361/321 X |
| 4,115,493 | 9/1978 | Sakabe | 361/321 X |
| 4,135,224 | 1/1979 | Maher | 361/321 |

OTHER PUBLICATIONS

Stetson, H., Dielectric Properties of Zirconates, Journal of the American Ceramic Society, vol. 56, No. 7, Jul. 1973, pp. 352-354.

Primary Examiner—Richard R. Kucia
Attorney, Agent, or Firm—Connolly and Hutz

[57] ABSTRACT

A monolithic ceramic capacitor having buried nickel electrodes is made by forming a paint of alkaline earth zirconates, a boron containing powder and an organic vehicle and binder. Nickel containing films are buried between dried and stacked layers of the paint. The stack is fired in a partial oxygen atmosphere at from 1200° C. to 1400° C. to produce a fully densified ceramic having a dielectric constant of greater than 30 and to provide a nickel electroded monolithic capacitor having a Q of greater than 1000 and a TCC of between ±30 ppm/°C. or better.

6 Claims, 2 Drawing Figures

MONOLITHIC CAPACITOR WITH LOW FIRING ZIRCONATE AND NICKEL ELECTRODES

CROSS-REFERENCES TO RELATED APPLICATIONS

The present application is a continuation-in-part of my copending application Ser. No. 715,036 filed Aug. 17, 1976, subsequently issuing on July 18, 1978 as U.S. Pat. No. 4,101,952.

BACKGROUND OF THE INVENTION

This invention relates to monolithic ceramic capacitors having base-metal electrodes and more particularly to such capacitors wherein the dielectric body is a low-firing reduction-resistant zirconate having a temperature-stable dielectric constant and low losses at mega-Hertz frequencies.

Alkaline earth metal zirconates have been used for dielectric resonators and as microstrip substrates at microwave frequencies. These ceramic materials are typically zirconate solid solutions including more than one of the alkaline earth metals that are proportioned to achieve a low temperature coefficient of the dielectric constant. These ceramic materials have been thought of as being capable of providing the highly desirable combination of properties at high frequencies which include low losses (loss tangent <0.001 or Q>1000), a dielectric constant greater than 25 and good temperature stability (e.g., a change rate in the dielectric constant over the temperature range of $-55°$ C. to $+125°$ C. of less than 30 ppm/°C). These materials are typically fired in air at 1450° C. for 4 hours to achieve full densification and realization of the above noted useful dielectric properties.

It is also known to employ such zirconates in a monolithic ceramic capacitor having buried cobalt electrodes. Cobalt has a melting temperature of 1495° C., and so will not melt and flow out of a ceramic body being fired at 1450° C. or lower. However, this capacitor requires much care in firing since the firing temperature required to densify the zirconate and the melting temperature of the cobalt electrode are quite close. Nickel electrodes would offer a lower cost electrode as well as a higher electrical conductivity electrode leading to a capacitor having smaller IR losses in the electrodes and thus a higher Q. The resistivities of cobalt and nickel are 8.0 and 6.8 micro-ohm centimeters, respectively. The melting temperature of nickel, however, is 1453° C. and cannot be employed in such a capacitor.

It is an object of this invention to provide an improved monolithic ceramic capacitor having a low firing zirconate dielectric body with at least one nickel electrode buried therein.

It is a further object of this invention to provide such a capacitor having a relatively low cost.

SUMMARY OF THE INVENTION

A monolithic ceramic capacitor has a low-firing reduction-resistant zirconate body with at least one nickel electrode buried therein. Another electrode contacts the body, being either also buried within the body or being formed on an outer surface of the body, such that the electrodes are spaced from each other by a layer of the ceramic body and thus are in mutual capacitive relationship.

The zirconate body consists essentially of from 90 to 99.75 percent by weight of an alkaline earth metal zirconate and from 0.25 to 10 percent by weight of an oxidized boron compound. This compound may be boria, boric acid, or compounds with alkaline earth metal oxides such as a.e. borates, a.e. alumino-borates, a.e. borosilicates, and a.e. aluminum borosilicates. Such oxidized boron compounds may be crystalline or non-crystalline compounds (e.g. a borate glass).

Capacitors of this invention are made by preparing a slip or paint consisting essentially of a powdered boron containing material, a precursor powder or an alkaline earth zirconate and an organic binder medium. The zirconate may be a mixture of separate alkaline earth zirconates and amounts to from 90 to 99.75 wt % of the powders in the paint. The boron material is preferably selected from elemental boron, boria, boric acid and an alkaline earth borate.

A plurality of layers are formed of the paint. A film of a nickel containing paste is deposited over a surface of at least one of the layers and the layers are stacked so as to bury the nickel film within the stack.

The stack, with the buried nickel film, is heated at a temperature of 1200° C. to 1400° C. in an atmosphere of partial oxygen pressure less than about $10^{-6}$ atmospheres to sinter and fully densify the ceramic.

The addition of small amounts of the above said boron compounds to the alkaline earth metal zirconate ceramic formulation, is also capable of reducing the required sintering temperature of the zirconate to within the range of 1400° C. to 1200° C., advantageously permitting the use of nickel electrodes and minimizing the cost of firing. The overall electrical properties of the fired dielectric body are excellent. Unexpectedly, the boron modified zirconates of this invention exhibit about the same dielectric constants and Q's of the similar but unmodified zirconate materials known in the art. The intergranular boron containing phase, even in amounts up to 10 weight percent, has a surprisingly small degrading effect on the dielectric constant and the Q.

DESCRIPTION OF THE PREFERRED EMBODIMENTS

Figure 1:
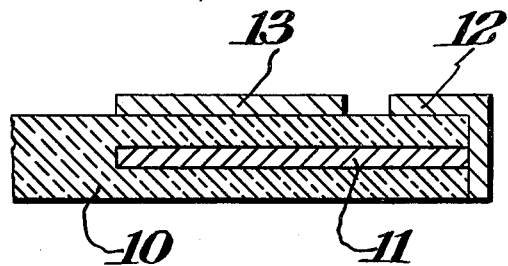
FIG. 1 shows in cross sectional view a monolithic capacitor of this invention having a reduction resistant zirconate body 10, one nickel electrode 11 buried therein, an external conductive terminal 12 by which external contact is made to the electrode 11, and another electrode 13 in contact with body 10 and in capacitive relationship with buried electrode 11.
Figure 2:
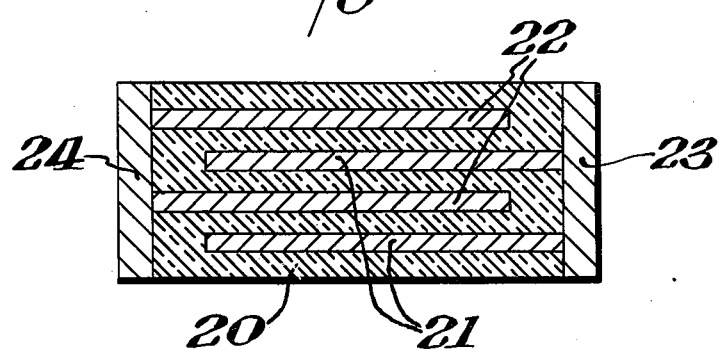
FIG. 2 shows in cross sectional view a monolithic capacitor of this invention having a reduction resistant zirconate body 20, a group of nickel electrodes 21 being interleaved with and in capacitive relationship with another group of nickel electrodes 22, all said electrodes being buried within the body 20, and external terminals 23 and 24 being connected to the group 21 and group 22 electrodes, respectively.

A series of experimental capacitors of the type shown in FIG. 2 were made. In each case they were made by conventional manufacturing steps including making a ceramic paint or slip, forming paint layers, drying the layers, depositing an electroding paste film on a surface of the layers, stacking the layers, and firing the stack to completely burn out residual organic binders and solvents of the paint and electroding paste, and to sinter and fully densify the ceramic. The mature ceramic layer between any two adjacent electrodes is referred to as an active dielectric layer since it is subject to a voltage stress when a voltage is applied between the capacitor terminals.

EXAMPLE 1

A ceramic paint was made from 265.5 grams (88.5 wt %) of $CaZrO_3$, 30.0 grams (10 wt %) $BaZrO_3$ and 4.5 grams (1.5 wt %) of fused boric acid by milling 12 hours in a conventional solvent and binder system. All zirconate powders employed in making the capacitors of this and the following examples were obtained from Transelco Inc., Penn Yan, N.Y. These powders had an average particle size of 1.5 to 2.0 microns. Monolithic capacitors were made with nickel electrodes using the screen printing technique. These capacitors have one active dielectric layer approximately 32 microns thick and with an area of about 12 mm². The organic binder was buried out in air at 425° C. and then the capacitors were sintered 2 hours at 1350° C. in a $CO_2$—CO atmosphere that produced an oxygen partial pressure of $10^{-7}$ atmospheres of oxygen as measured by a zirconia oxygen monitor in the hot-zone of the furnace. The capacitors were terminated after sintering by the gold-plating and silver paint technique described by Hurley in U.S. Pat. No. 3,809,973 issued May 7, 1974. Leads were attached by dip soldering. At 25° C. these capacitors have an average capacitance of 99.3 picofarads at 1 MHz (K=30±3) with a Q of 1500±50. Temperature coefficient of capacitance (TCC) is approximately −10 ppm/°C. from −55° to 25° C., and ±15 ppm/°C. from 25° to 125° C. These capacitors perform well within the Electronic Industries Association (E.I.A.) "COG" standard for dielectric materials, which standard calls for a Q greater than 1000 and TCC less than plus or minus 30 ppm/°C. from −55° C. to 125° C.

It is seen here that using only 1.5 wt % of boric acid results in reducing the firing temperature at which full densification is achieved by about 100° C. It can be determined that the atomic ratio Ba/Ca is 0.073. Such a zirconate, without additives, is shown to have a TCC of about −100 ppm in a publication by R. C. Kell, et al, (Electronic Letters, Vol. 6, No. 19, Sept. 17, 1970, pages 614–616).

EXAMPLE 2

In this example ceramic paint was made from 4000 grams (88.5 wt %) of $CaZrO_3$ 452 grams (10 wt %) of $BaZrO_3$, 45.2 grams (1 wt %) of fused boric acid, and 22.6 grams (0.5 wt %) of silica, again using a conventional binder and solvent system. Monolithic capacitors with nickel electrodes were made by the curtain-coating process described by Hurley et al in U.S. Pat. No. 3,717,487 issued Feb. 20, 1973, and fired and terminated as in Example 1. These capacitors had four active dielectric layers each approximately 24 microns thick and 20 mm² in area. Average capacitance at 1 MHz is 994 pF (K=33±3) with a Q of 1250±50. The TCC is −15 ppm/°C. from −55° to 25° C., and +10 ppm from 25° to 125° C.

EXAMPLE 3

Monolithic ceramic capacitors with nickel electrodes were made as in Example 1 but the ceramic composition was as follows:

288.0 grams (90 wt %) $CaZrO_3$
16.0 grams (5 wt %) $BaZrO_3$
16.0 grams (5 wt %) Borate glass The borate glass was a barium aluminoborate having the composition (in mols) $4BaO—Al_2O_3—2B_2O_3$, and was prepared as described in U.S. Pat. No. 3,902,102, issued Aug. 26, 1975. These capacitors have one active dielectric layer 56 microns thick with area 9.6 mm². Capacitance at 1 MHz is 59 pF (K=39±3), with a Q of 1550±50. The TCC is −10 ppm from −55° to 25° C. and +10 ppm from 25° to 125° C.

It is shown in the Kell, et al, publication that a $BaZrO_3$ ceramic alone wherein the atomic ratio Ba/Ca is the same as in the precursor zirconates in this example (0.036) has a TCC of about −35 ppm/°C. However, the barium of the glass in this example is available to react with the zirconate phase and if all of the barium is taken into this ceramic phase the ratio Ba/Ca is 0.083. The above noted paper by Kell et al indicates that a zirconate of this composition would be expected to have a TCC of −110 ppm which suggests that Kell et al, did not obtain a solid solution at firing as was accomplished here.

EXAMPLE 4

These capacitors were made as in Example 1 but with the formulation as follows:
280.0 grams (90.3 wt %) $CaZrO_3$
30.0 grams (9.7 wt %) Borate glass The borate glass was the same material as that used in Example 3. These capacitors were fired in the same mixture of $CO_2$ and CO as before but a temperature of only 1250° C. was required to obtain good densification. The active dielectric layer thickness was approximately 56 microns with an area of 10.6 mm². Average capacitance at 1 MHz was 55 pF (K=36±3) with a Q of 1050. TCC was better than 5 ppm/°C from −55° to 125° C. Although no barium zirconate was used in these capacitors, it is evident that sufficient barium from the glass reacted with the calcium zirconate during firing to modify its electrical characteristics. If all the barium from the glass is incorporated into the zirconate phase at firing, the resulting Ba/Ca atomic ratio becomes 0.090. Calcium zirconate alone has a K of 30 and a TCC of approximately +40 ppm/°C. It is suspected, however, that increasing the amount of borate glass above 10 wt%, to lower the sintering temperature further might lower Q below 1000.

EXAMPLE 5

The composition of these capacitors was as follows:
182.0 grams (56.9 wt %) $BaZrO_3$
122.0 grams (38.1 wt %) $SrZrO_3$
16.0 grams (5 wt %) Borate glass Monolithic capacitors with nickel electrodes were prepared and fired as in Examples 1 and 3. Dielectric thickness is approximately 45 microns and the area is 11 mm². Average capacitance at 1 MHz is 75 pF (K=34±3) and the Q is 2000±200. The TCC is +35 ppm/°C. from −55° to 25° C. and +20 ppm from 25° to 125° C. Although TCC is outside COG limits it is apparent that a slightly higher Ba/Sr ratio in the formulation would bring the TCC within the ±30 ppm limits.

EXAMPLE 6

The monolithic capacitors of this example were prepared as in Example 1 except the solids in the ceramic paint consisted of 288 grams (90.6 wt %) $CaZrO_3$, 16.0 grams (5 wt %) $BaZrO_3$, 10.0 grams BaO (3.1 wt%) and 4.0 grams (1.3 wt %) fused boric acid ($H_3BO_3$). The thickness of the active dielectric layer is 66 microns and the active area 10.2 mm². The average capacitance at 1 MHz is 41.7 picofarads (K=31±3) with a Q of 3700±100. The TCC is within ±10 ppm/°C. from −55° C. to 125° C.

EXAMPLE 7

The monolithic capacitors of this example were made as in Example 2 except that the solids in the ceramic paint consisted of 1579 grams (87.7 wt%) of $CaZrO_3$, 171 grams (9.5 wt%) $BaZrO_3$, 45 grams (2.5 wt%) of $CaCO_3$ and 5 grams (0.3 wt%) of amorphous boron powder which was supplied by Cotronics Corporation. The elemental boron is converted during firing to boric oxide and barium-calcium borate. The Ba/Ca ratio is computed to be 0.067. These capacitors have four active dielectric layers each being 51 microns thick and five buried nickel electrode films. The active area of each dielectric layer is 18.5 mm². The average capacitance at 1 MHz is 383 picofarads (K=30±3) with Q of 2500±250. The TCC is −20 ppm/°C. from −55° L to 25° C. and +5 ppm/°C. from 25° to 125° C.

The calcium carbonate in Example 7 may more generally have been an alkaline earth salt or oxide. The calcium (alkaline earth) from this additive reacts with any zirconia that may be present in the start zirconate powder, the rest reacting with the boron to become calcium borate.

From the experimental data provided above, except for Example 5, it is concluded that the atomic ratio of barium to calcium in the densified zirconate phase should be from 0.065 to 0.09 to obtain the most stable dielectric constant as a function of operating temperatures. In example 5, the atomic ratio of barium to strontium is 1.36, which ratio seems to be a little lower than that which would provide the most stable TCC.

From examples 3 and 7 wherein the boron in the powdered start materials amounts to 0.25 to 0.3 weight %, respectively, it is judged that bodies made in accordance with the principles of this invention must include at least 0.15 wt % boron.

It may be noted that when considered in molar units, the amount of boron in the body of the examples is substantial. In example 3, the boron amounts to 3.9 gram mol % of the formulation. In Example 7, the boron amounts to 4.5 gram mol %.

In the above mentioned Kell, et al, publication and additionally in a paper by Stetson, et al, (Dielectric Properties of Zirconates, Journal of the American Ceramic Society, Vol. 44, No. 8, pages 420–421) the dielectric constants and other electrical properties that the art expects of the alkaline earth zirconates is elaborated. The zirconates of the present invention exhibit dielectric constants and Q's nearly as high as those of the prior art, which is particularly surprising since the dielectric constant of boron glasses and other boron compounds is significantly less than that of the zirconates alone, and boron does not react with and become a part of the zirconate crystal phase in the firing of the capacitors of this invention.

What is claimed is:
1. A monolithic ceramic capacitor comprising: a low-firing reduction-resistant zirconate body, said body having a full densification temperature of less than 1400° C., said body consisting essentially of from 90 to 99.85 percent by weight of a high firing phase selected from barium zirconate, strontium zirconate, calcium zirconate and combinations thereof, and from 0.15 to 10 percent by weight of a low melting boron phase; a nickel electrode being buried within said body; and another metal electrode contacting said body and being in capacitive relationship with said buried electrode.

2. The capacitor of claim 1 wherein said boron phase is selected from boria and an alkaline earth borate.

3. The capacitor of claim 1 wherein said zirconate phase is a calcium-barium-zirconate wherein the atomic ratio of said barium to said calcium is from 0.065 to 0.09.

4. The capacitor of claim 2 wherein said borate is an alkaline earth alumino borate.

5. The capacitor of claim 4 wherein said borate is essentially $4BaO.Al_2O_3.2B_2O_3$.

6. The capacitor of claim 2 wherein said borate is an alkaline earth borosilicate.

* * * * *